United States Patent
Jung

(10) Patent No.: US 12,159,388 B2
(45) Date of Patent: Dec. 3, 2024

(54) AUTO QUALIFICATION DEVICE AND AUTO QUALIFICATION METHOD

(71) Applicant: Samsung Display Co., LTD., Yongin-si (KR)

(72) Inventor: Sukbin Jung, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 587 days.

(21) Appl. No.: 17/377,911

(22) Filed: Jul. 16, 2021

(65) Prior Publication Data

US 2022/0044390 A1    Feb. 10, 2022

(30) Foreign Application Priority Data

Aug. 7, 2020    (KR) .................. 10-2020-0099473

(51) Int. Cl.
*G06T 7/00*       (2017.01)
*G06F 18/214*     (2023.01)
(Continued)

(52) U.S. Cl.
CPC .......... *G06T 7/0004* (2013.01); *G06F 18/214* (2023.01); *G06T 11/001* (2013.01);
(Continued)

(58) Field of Classification Search
None
See application file for complete search history.

(56) References Cited

U.S. PATENT DOCUMENTS

| | | | |
|---|---|---|---|
| 2020/0334578 A1* | 10/2020 | Ikeda | G06N 3/088 |
| 2020/0364906 A1* | 11/2020 | Shimodaira | G06V 10/82 |
| 2021/0019499 A1* | 1/2021 | Takahashi | G06T 5/60 |

FOREIGN PATENT DOCUMENTS

| | | |
|---|---|---|
| CN | 108956653 | 12/2018 |
| CN | 107610111 | 12/2019 |

(Continued)

OTHER PUBLICATIONS

Zhang, Haoxin, Xiaoguang Di, and Yu Zhang. "Real-time CU-net-based welding quality inspection algorithm in battery production." IEEE Transactions on Industrial Electronics 67.12 (2020): 10942-10950. (Year: 2020).*

(Continued)

*Primary Examiner* — Sean M Conner
(74) *Attorney, Agent, or Firm* — KILE PARK REED & HOUTTEMAN PLLC

(57) ABSTRACT

An auto qualification device for a test target device includes a camera that generates device image data by capturing a device image of the test target device, a detector that marks a label at a target object within the device image of the test target device by using a detection learning model trained based on a detection training set of device image training data and label image training data corresponding to the device image training data, a region determiner that determines a qualification region within the device image of the test target device based on a position of the label, and a qualification determiner that determines whether the target object within the qualification region is defective by using a qualification learning model trained based on a qualification training set of qualification region image training data and a training qualification result for the qualification region image training data.

15 Claims, 12 Drawing Sheets

(51) Int. Cl.
  *G06N 3/02*        (2006.01)
  *G06T 11/00*       (2006.01)
(52) U.S. Cl.
  CPC .............. *G06T 2207/20081* (2013.01); *G06T 2207/30148* (2013.01); *G06T 2207/30152* (2013.01)

(56) References Cited

FOREIGN PATENT DOCUMENTS

| | | |
|---|---|---|
| CN | 110910363 | 3/2020 |
| KR | 10-1803471 | 12/2017 |
| KR | 10-2020-0041813 | 4/2020 |

OTHER PUBLICATIONS

Van Etten, Adam. "You only look twice: Rapid multi-scale object detection in satellite imagery." arXiv preprint arXiv:1805.09512 (2018). (Year: 2018).*

Jeong, Yong-Cheol, et al. "Microstructure-based analysis of fine metal mask cleaning in organic light emitting diode display manufacturing." Micro and Nano Systems Letters 7.1 (2019): 1-7. (Year: 2019).*

* cited by examiner

AUTO QUALIFICATION DEVICE AND AUTO QUALIFICATION METHOD

CROSS-REFERENCE TO RELATED APPLICATION(S)

This application claims priority to and benefits of Korean Patent Application No. 10-2020-0099473 under 35 U.S.C. § 119, filed on Aug. 7, 2020 in the Korean Intellectual Property Office, the entire contents of which are incorporated herein by reference.

BACKGROUND

1. Technical Field

Embodiments relate generally to test devices. Embodiments relate to auto qualification devices and auto qualification methods.

2. Description of the Related Art

In each process for manufacturing an electronic or mechanical device, a test (or inspection) process that determines whether the device is a good product or a defective product or that detects a defect of the device may be performed during the process or after the process. For example, in respective processes for manufacturing a display device, such as an one-sheet manufacturing process, a cell manufacturing process, a module manufacturing process, for example, the test process for detecting the defect may be performed.

A related art test process may detect the defect with the naked eye of a human operator, and thus may have a low accuracy and a low reliability. To improve the accuracy and the reliability, a test process using a rule-based image processing has been developed which captures a device image of a test target device (or a device under test) and detects/qualifies a target object within the device image by using a predetermined rule. However, even in the test process using the rule-based image processing, the target object may be erroneously detected or erroneously qualified.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide an auto qualification device that rapidly and accurately detects and judges a target object.

Embodiments provide an auto qualification method that rapidly and accurately detects and judges a target object.

According to an embodiment, an auto qualification device for a test target device may include a camera that generates device image data by capturing a device image of the test target device; a detector that marks a label at a target object within the device image of the test target device by using a detection learning model trained based on a detection training set of device image training data and label image training data corresponding to the device image training data; a region determiner that determines a qualification region within the device image of the test target device based on a position of the label; and a qualification determiner that determines whether the target object within the qualification region is defective by using a qualification learning model trained based on a qualification training set of qualification region image training data and a training qualification result for the qualification region image training data.

In an embodiment, a color of the label marked by the detector may be different from a color of the device image of the test target device captured by the camera.

In an embodiment, the device image of the test target device may be a black-and-white image, and the label marked by the detector may be a red dot.

In an embodiment, the detector may generate labeled device image data representing the device image of the test target device where the label may be marked by marking the label at the target object within the device image of the test target device, and may generate label image data representing the label by separating an image having a color of the label from the labeled device image data.

In an embodiment, the detector may include a detection training database that stores the detection training set of the device image training data and the label image training data; and the detection learning model trained based on the detection training set stored in the detection training database. A set of the device image data and the label image data may be accumulatively stored as the detection training set in the detection training database for a subsequent learning of the detection learning model.

In an embodiment, the region determiner may obtain a coordinate of the label in the device image of the test target device where the label may be marked; may determine the qualification region having a predetermined shape based on the coordinate of the label; and may generate qualification region image data representing the qualification region including the target object by cropping the qualification region from the device image of the test target device.

In an embodiment, the predetermined shape of the qualification region may be a substantially circular shape, a substantially rectangular shape or a substantially polygonal shape.

In an embodiment, the qualification determiner may receive the qualification region image data representing the qualification region including the target object from the region determiner; and may generate a qualification result by determining whether the target object within the qualification region represented by the qualification region image data is defective.

In an embodiment, the qualification determiner may include a qualification training database that stores the qualification training set of the qualification region image training data and the training qualification result; and the qualification learning model trained based on the qualification training set stored in the qualification training database. A set of the qualification region image data and the qualification result may be accumulatively stored as the qualification training set in the qualification training database for a subsequent learning of the qualification learning model.

In an embodiment, the test target device may be a fine metal mask assembly, and the target object may be a welding point in the fine metal mask assembly.

In an embodiment, the test target device may be a display panel or a semiconductor wafer.

According to an embodiment, an auto qualification device for a test target device may include a camera that generates device image data by capturing a device image of the test target device; and a detecting and qualification determiner that marks a first label at a first target object and a second label at a second target object within the device image of the test target device by using a detection and qualification learning model trained based on a detection and qualification training set of device image training data, first label image training data corresponding to the device image training data, and second label image training data corresponding to the device image training data.

In an embodiment, the device image of the test target device may have a first color, the first label may have a second color different from the first color of the device image of the test target device, and the second label may have a third color different from the first color of the device image of the test target device and the second color of the first label.

In an embodiment, the device image of the test target device may be a black-and-white image, the first label may be a red dot, and the second label may be a blue dot.

In an embodiment, the detecting and qualification determiner may generate labeled device image data representing the device image of the test target device where the first label and the second label may be marked by marking the first label at the first target object within the device image of the test target device and by marking the second label at the second target object within the device image of the test target device; may generate first label image data representing the first label by separating an image having a color of the first label from the labeled device image data; and may generate second label image data representing the second label by separating an image having a color of the second label from the labeled device image data.

In an embodiment, the detecting and qualification determiner may include a detection and qualification training database that stores the detection and qualification training set of the device image training data, the first label image training data and the second label image training data; and the detection and qualification learning model trained based on the detection and qualification training set stored in the detection and qualification training database. A set of the device image data, the first label image data and the second label image data may be accumulatively stored as the detection and qualification training set in the detection and qualification training database for a subsequent learning of the detection and qualification learning model.

According to an embodiment, there is provided an auto qualification method for a test target device that may include training a detection learning model based on a detection training set of device image training data and label image training data corresponding to the device image training data; training a qualification learning model based on a qualification training set of qualification region image training data and a training qualification result for the qualification region image training data; generating device image data by capturing a device image of the test target device; marking a label at a target object within the device image of the test target device by using the detection learning model; determining a qualification region within the device image of the test target device based on a position of the label; and whether the target object within the qualification region is defective is determined by using the qualification learning model.

In an embodiment, a color of the label may be different from a color of the device image of the test target device.

In an embodiment, the device image of the test target device may be a black-and-white image, and the label may be a red dot.

In an embodiment, the marking the label at the target object may include generating labeled device image data representing the device image of the test target device where the label may be marked by marking the label at the target object within the device image of the test target device; and generating label image data representing the label by separating an image having a color of the label from the labeled device image data. A set of the device image data and the label image data may be accumulatively stored as the detection training set in a detection training database for a subsequent learning of the detection learning model.

As described above, in an auto qualification device and an auto qualification method according to embodiments, a label may be marked at a target object within a device image by using a detection learning model that may be trained based on a detection training set, a qualification region within the device image may be determined based on a position of the label, and whether the target object within the qualification region is defective may be determined by using a qualification learning model that may be trained based on a qualification training set. Accordingly, accuracy and reliability of detection and qualification for the target object may be improved.

Further, in the auto qualification device and the auto qualification method according to embodiments, by using a detection and qualification learning model that may be trained based on a detection and qualification training set, a good or first label may be marked at a good or first target object within a device image, and a defective or second label may be marked at a defective or second target object within the device image. Accordingly, accuracy and reliability of detection and qualification for the good or first/defective or second target object may be improved.

BRIEF DESCRIPTION OF THE DRAWINGS

Illustrative, non-limiting embodiments will be more clearly understood from the following detailed description taken in conjunction with the accompanying drawings in which.

DETAILED DESCRIPTION OF THE EMBODIMENTS

Figure 1:
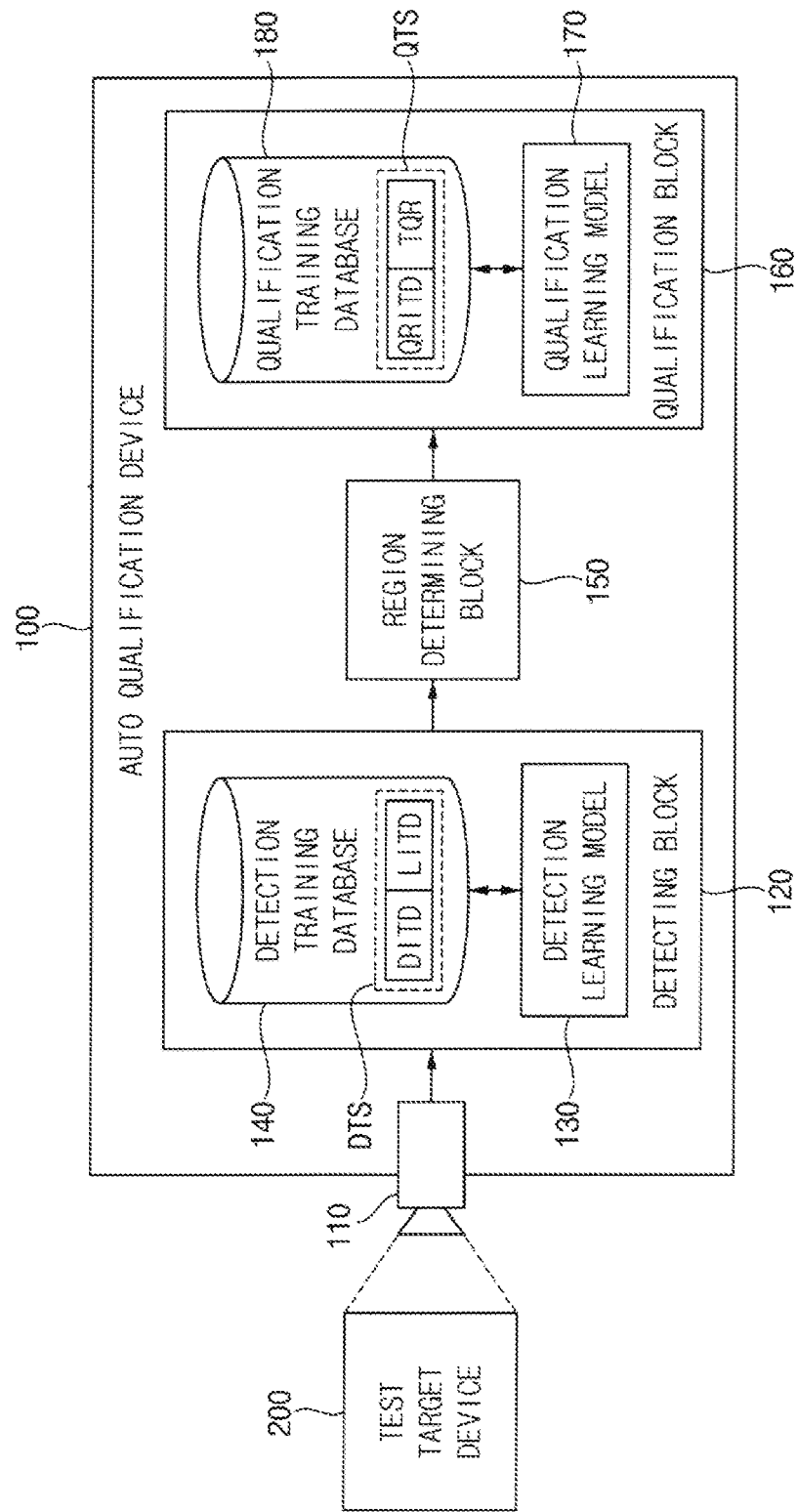
FIG. 1 is a block diagram illustrating an auto qualification device according to embodiments.

The embodiments are described more fully hereinafter with reference to the accompanying drawings. Like or similar reference numerals refer to like or similar elements throughout.

The disclosure may be variously modified and realized in many different forms, and thus embodiments will be illustrated in the drawings and described in detail hereinbelow. However, the disclosure should not be limited to the disclosed forms, and instead be construed to include all modifications, equivalents, or replacements included in the spirit and scope of the disclosure.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B.

As used herein, the singular forms, "a", "an" and "the" are intended to include the plural forms as well, unless the context clearly indicates otherwise.

While such terms as "first," "second," etc., may be used to describe various components, such components must not be limited to the above terms. The above terms are used only to distinguish one component from another.

It will be further understood that the terms "comprises" and/or "comprising", "includes" and/or "including", "has", "have" and/or "having" and their variations when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
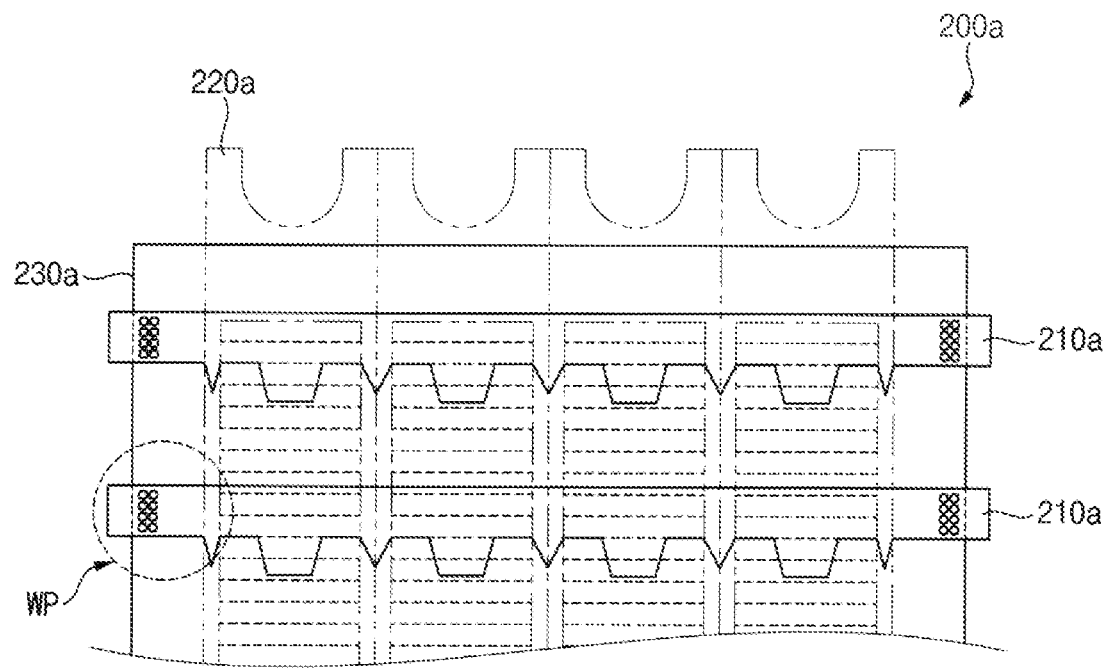
FIG. 2A is a diagram illustrating an example of a test target device.
Figure 2B:
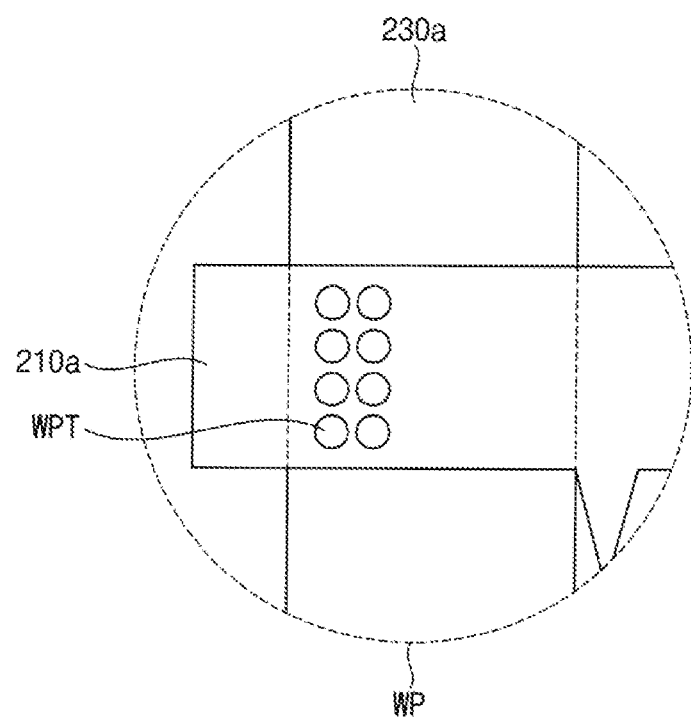
FIG. 2B is a diagram illustrating an example of a target object within the test target device.
Figure 3:
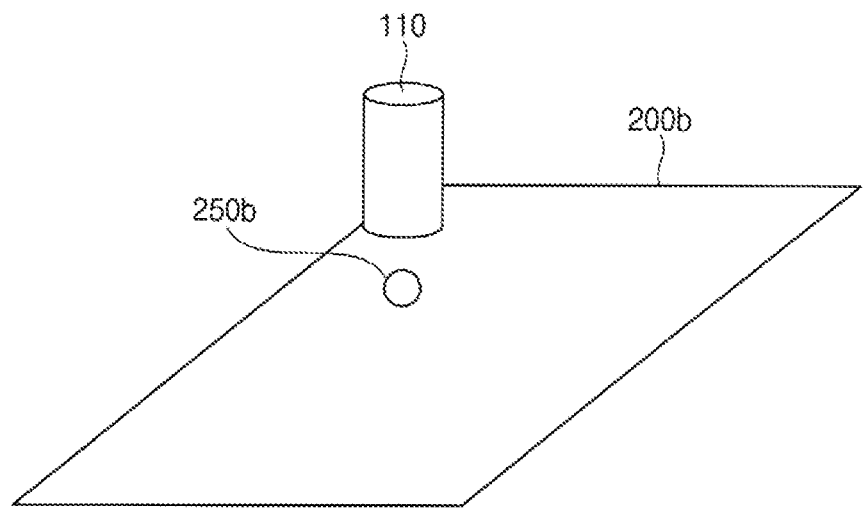
FIG. 3 is a diagram illustrating another example of a test target device.
Figure 4:
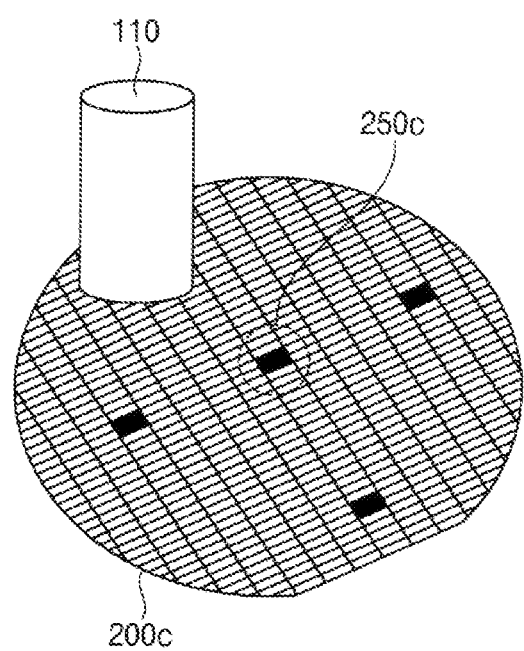
FIG. 4 is a diagram illustrating still another example of a test target device.
Figure 5:
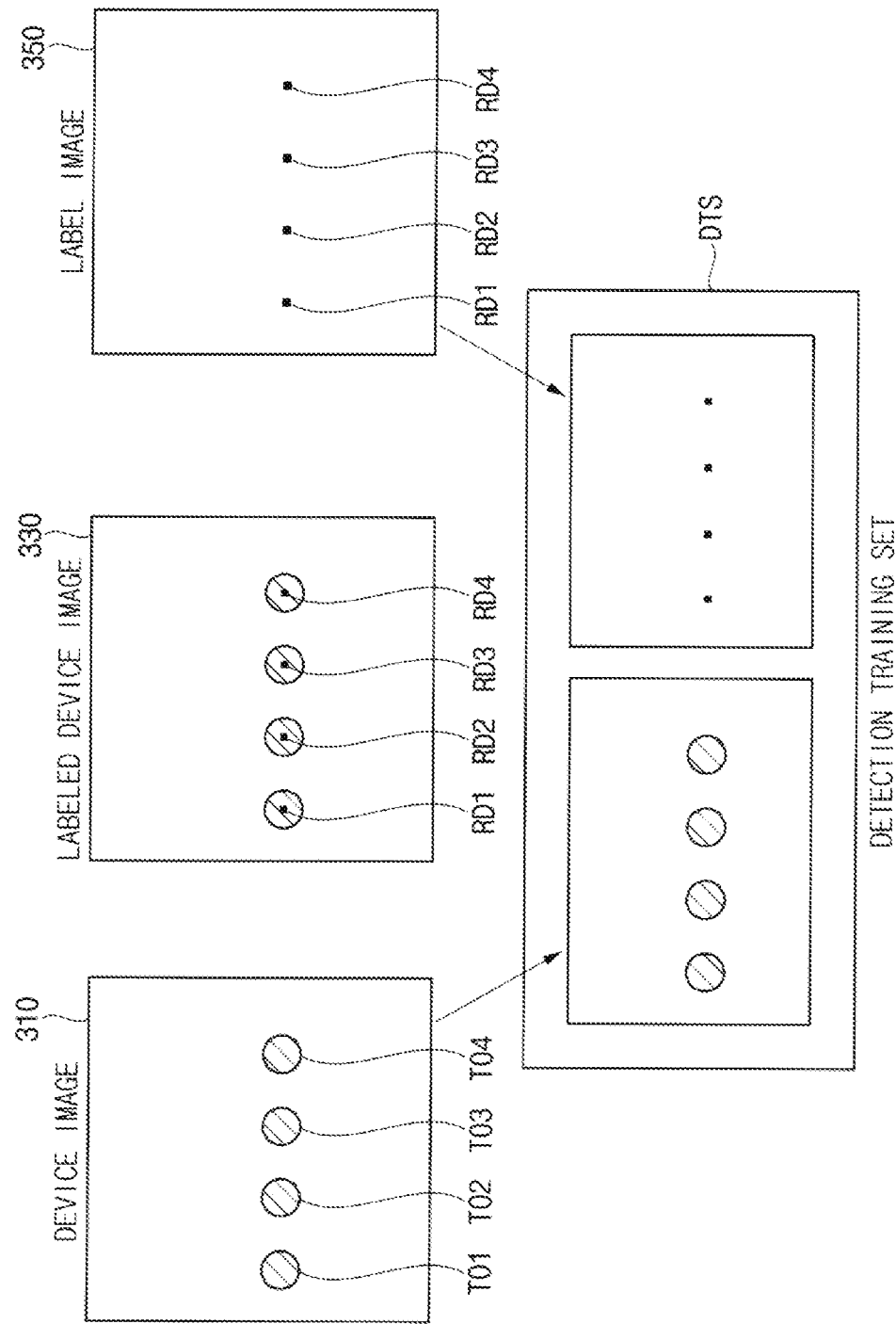
FIG. 5 is a diagram for describing an example of a detection training set.
Figure 6:
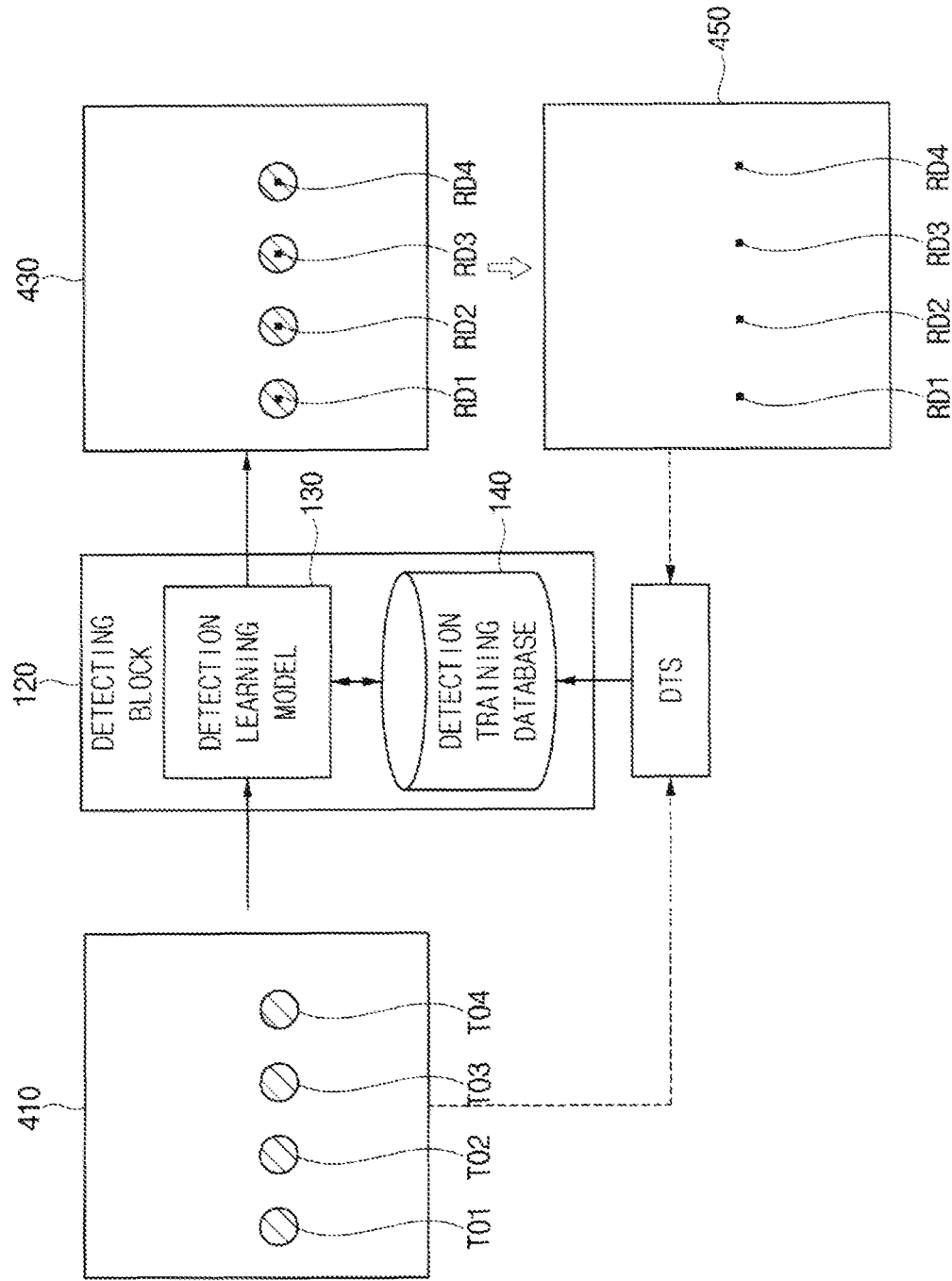
FIG. 6 is a diagram for describing an example of an operation of a detecting block.
Figure 7:
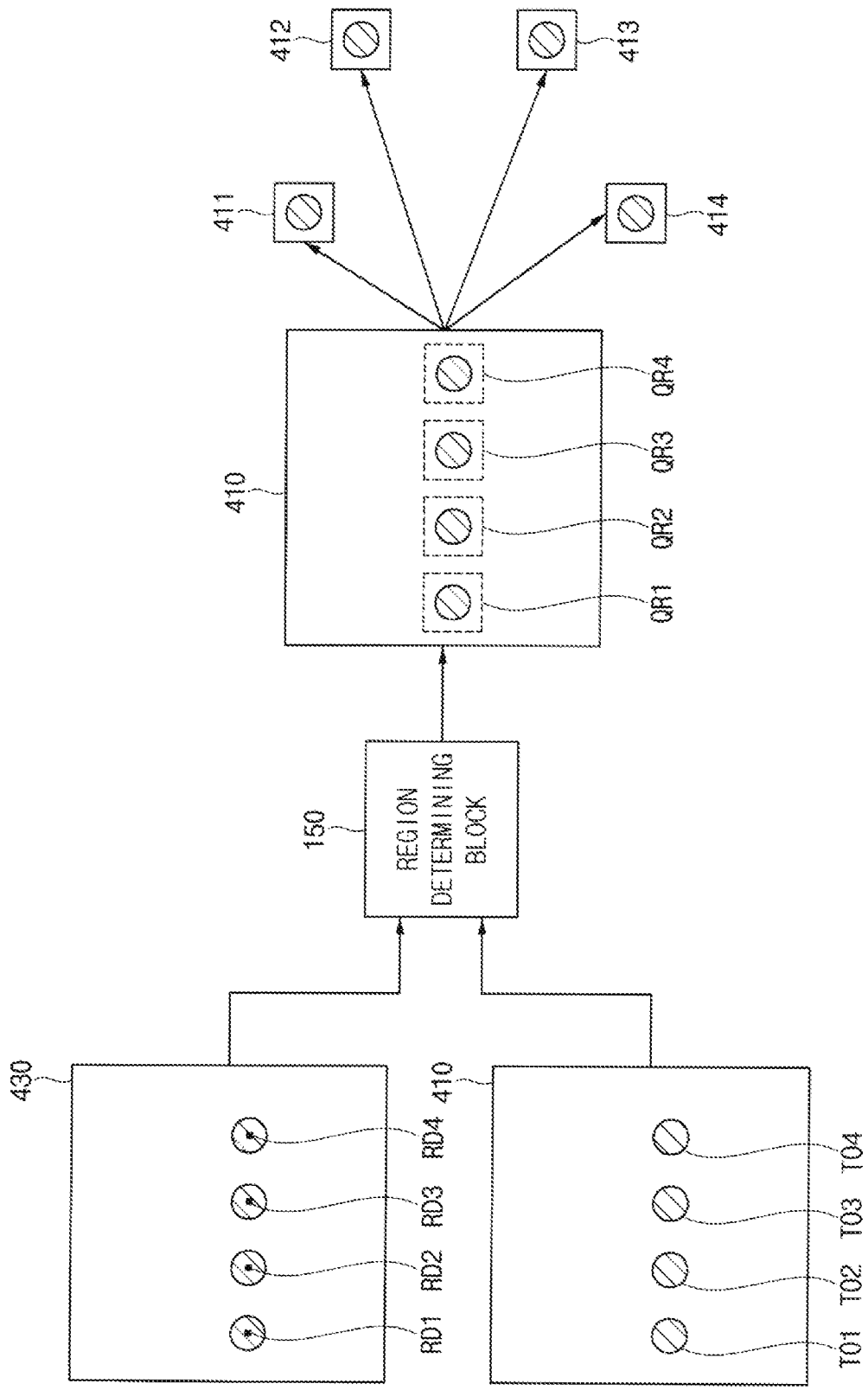
FIG. 7 is a diagram for describing an example of an operation of a region determining block.
Figure 8A:
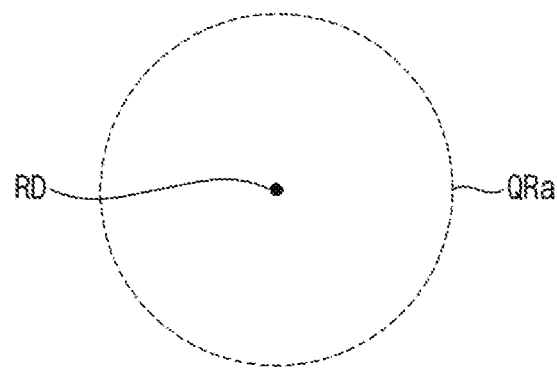
FIGS. 8A through 8C are diagrams illustrating examples of a qualification region determined based on a coordinate of a label.
Figure 8B:
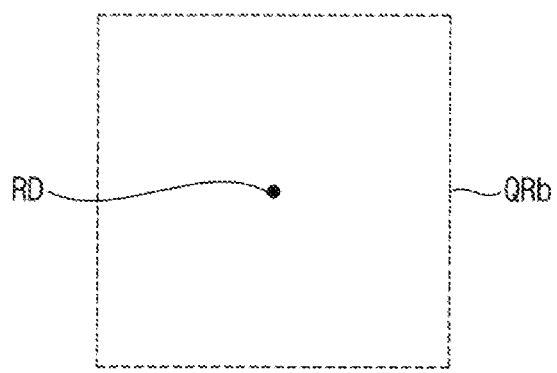
Figure 8C:
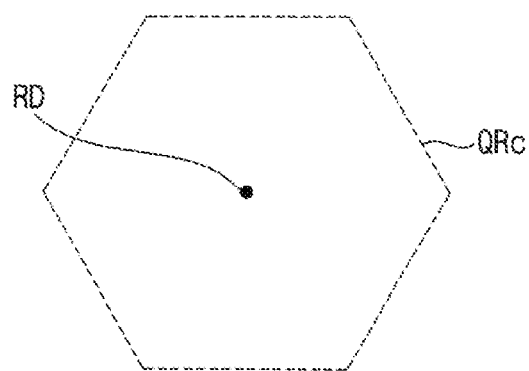
Figure 9:
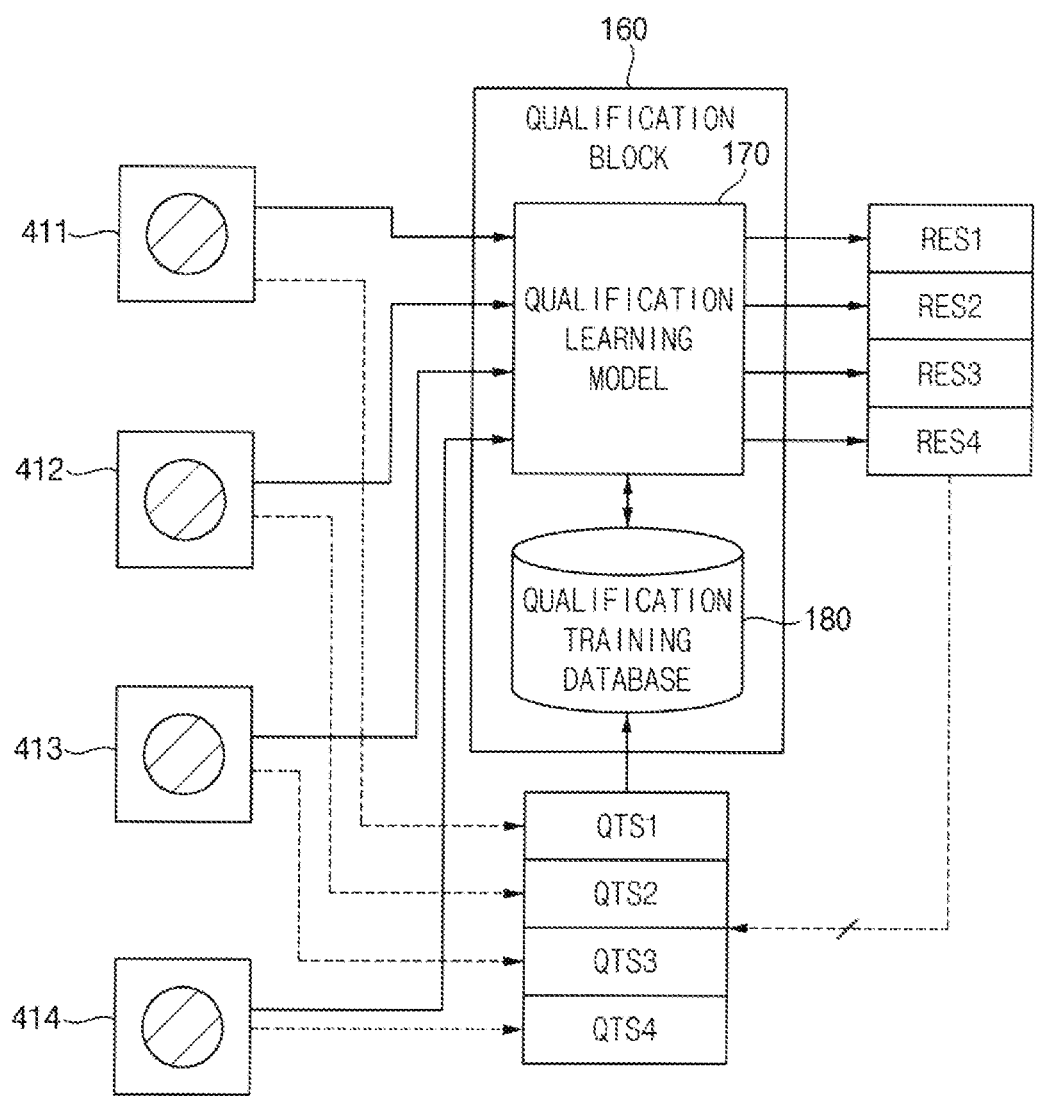
FIG. 9 is a diagram for describing an example of an operation of a qualification block.

It is to be understood that the term "block" may include a processor, a computer, or any other computing device as would be appreciated by one of ordinary skill in the art, FIG. 1 is a block diagram illustrating an auto qualification device according to embodiments, FIG. 2A is a diagram illustrating an example of a test target device, FIG. 2B is a diagram illustrating an example of a target object within the test target device, FIG. 3 is a diagram illustrating another example of a test target device, FIG. 4 is a diagram illustrating still another example of a test target device, FIG. 5 is a diagram for describing an example of a detection training set, FIG. 6 is a diagram for describing an example of an operation of a detecting block, FIG. 7 is a diagram for describing an example of an operation of a region determining block, FIGS. 8A through 8C are diagrams illustrating examples of a qualification region determined based on a coordinate of a label, and FIG. 9 is a diagram for describing an example of an operation of a qualification block Referring to FIG. 1, an auto qualification device 100 according to embodiments may automatically determine whether a test target device 200 (or a device under test) is a good product or a defective product, or may automatically detect a defect of the test target device 200. Here, the test target device 200 (or the device under test) may be any electronic or mechanical device which is to be determined as the good product or the defective product or of which the defect is to be detected. The auto qualification device 100 for the test target device 200 may include a camera 110, a detecting block or detector 120, a region determining block or region determiner 150 and a qualification block or qualification determiner 160.

The camera 110 may generate device image data by capturing a device image of the test target device 200. According to embodiments, the camera 110 may capture an image of the entire region of the test target device 200, or may capture an image of a partial region of the test target device 200. In an embodiment, to determine whether the test target device 200 is the good product or the defective product, or to detect the defect of the test target device 200, the auto qualification device 100 may capture the device image of the test target device 200 by using the camera 110, may detect a target object within the device image, and may determine whether the target object is defective or not.

In an example, as illustrated in FIGS. 2A and 2B, the test target device 200 may be a fine metal mask (FMM) assembly 200a for forming an emission layer of a display panel. The FMM assembly 200a may include a frame 230a, long-side bars 210a fixed to the frame 230a, and masks 220a crossing the long-side bars 210a. The long-side bars 210a may be fixed to the frame 230a by welding. In an embodiment, the camera 110 may capture a partial image of the FMM assembly 200a, or an image of a welding portion WP in which each long-side bar 210a and the frame 230a are welded to generate the device image data representing the image of the welding portion WP. The auto qualification device 100 may detect, as the target objects, welding points WPT within the FMM assembly 200a in the image of the welding portion WP, and may determine whether the welding points WPT are defective.

In another example, as illustrated in FIG. 3, the test target device 200 may be a glass substrate or a display panel 200b. The camera 110 may generate the device image data representing an image of the display panel 200b by capturing the image of the display panel 200b. The auto qualification device 100 may detect a defect 250b in the image of the display panel 200b.

In another example, as illustrated in FIG. 4, the test target device 200 may be a semiconductor wafer 200c. The camera 110 may generate the device image data representing an image of the semiconductor wafer 200c by capturing the image of the semiconductor wafer 200c. The auto qualification device 100 may detect a defect 250c in the image of the semiconductor wafer 200c.

Although FIGS. 2A through 4 illustrate examples of the test target device 200, the test target device 200 qualified or judged by the test target device 200 is not limited to the FMM assembly 200a, the display panel 200b and the semiconductor wafer 200c, and may be any electronic or mechanical device.

The detecting block 120 may include a detection training database 140 that may store a detection training set DTS, or a pair of device image training data DITD and label image training data LITD corresponding to the device image training data DITD, and a detection learning model 130 that may be trained based on the detection training set DTS stored in the detection training database 140. According to embodiments, the detection learning model 130 may be any learning model, such as an artificial intelligence (AI) model, a machine learning model, a deep learning model, a convolutional neural network (CNN) model, a recurrent neural network (RNN) model, for example.

In an embodiment, the detection training set DTS, or the pair of the device image training data DITD and the label image training data LITD may be obtained as illustrated in FIG. 5. For example, as illustrated in FIG. 5, the device image training data DITD may be the device image data representing the device image 310 of the test target device 200 which may be obtained for learning or training of the detection learning model 130 by the camera 110. The device image 310 of the test target device 200 may include one or more target objects TO1, TO2, TO3 and TO4 on which qualification or judgment may be performed, or which are to be determined to be good or defective. One or more labels RD1, RD2, RD3 and RD4 may be marked at the one or more target objects TO1, TO2, TO3 and TO4 within the device image 310, and thus a labeled device image 330 or data (or labeled device image data) for the labeled device image 330 may be generated. In an embodiment, before the detection learning model 130 is initially learned, or until the detection learning model 130 is sufficiently learned, the labels RD1, RD2, RD3 and RD4 may be marked at the target objects TO1, TO2, TO3 and TO4 by, but not limited to, a human operator or a human manager. In an embodiment, a color of the labels RD1, RD2, RD3 and RD4 may be different from a color of the device image 310. An image having the color of the labels RD1, RD2, RD3 and RD4 may be separated from the labeled device image 330, and thus a label image 350 having only the labels RD1, RD2, RD3 and RD4 or data (or the label image training data LITD) for the label image 350 may be generated. Thus, the label image training data LITD may be label image data representing the label image 350, or the labels RD1, RD2, RD3 and RD4 which may be obtained for learning or training of the detection learning model 130. The pair of the device image training data DITD, and the label image training data LITD generated corresponding to the device image training data DITD as described above may be stored as the detection training set DTS in the detection training database 140. The detection learning model 130 may be learned or trained based on the detection training set DTS stored in the detection training database 140. In an example, the detection training set DTS may be generated by using the images 310, 330 and 350 for initial test target devices 200 among a plurality of test target devices 200 manufactured by the same process, and the detection learning model 130 may be learned or trained based on the detection training set DTS.

The detection learning model 130 learned or trained based on the detection training set DTS including the device image training data DITD and the label image training data LITD may receive the device image data representing the device image of the test target device 200 from the camera 110, and may mark a label at the target object within the device image represented by the device image data. Here, the target object may be any object in the test target device 200 on which qualification or judgment may be performed, or which is to be determined to be good or defective. For example, as illustrated in FIG. 2B, the target object may be, but is not limited to, the welding point WPT in the FMM assembly 200a. In an embodiment, a color of the label marked by the detection learning model 130 may be different from a color of the device image. For example, the device image may be a black-and-white image, and the label marked by the detection learning model 130 may be a red dot. However, according to embodiments, the label may have any color different from the color of the device image. Further, according to embodiments, the label may be a dot having any shape, or any other mark.

In an embodiment, the detection learning model 130 may generate labeled device image data representing the device image where the label may be marked by marking the label at the target object within the device image, and then the detecting block 120 may generate label image data representing the label by separating (data for) an image (or a channel) having the color of the label from the labeled device image data. A pair or a set of the device image data received from the camera 110 and the label image data generated corresponding to the device image data may be accumulatively stored as the detection training set DTS in the detection training database 140 for a subsequent learning of the detection learning model 130. Thus, the detection learning model 130 may be continuously (for example, permanently) learned or trained based on the detection training set DTS that may be automatically generated by the detecting block 120 or the detection learning model 130, and thus accuracy or reliability of the detection learning model 130 may be improved.

For example, as illustrated in FIG. 6, the detection learning model 130 may receive the device image data representing the device image 410 of the test target device 200 from the camera 110. In an embodiment, among the plurality of test target devices 200 manufactured by the same process, the device image 310 illustrated in FIG. 5 may be, but is not limited to, an image for the initial test target device 200, and the device image 410 illustrated in FIG. 6 may be, but is not limited to, an image for a subsequent test target device 200. The device image 410 of the test target device 200 may include one or more target objects TO1, TO2, TO3 and TO4 on which qualification or judgment may be performed, or which are to be determined to be good or defective. The detection learning model 130 may generate the labeled device image data representing a device image 430 where one or more labels RD1, RD2, RD3 and RD4 may be marked by marking the one or more labels RD1, RD2, RD3 and RD4 at the one or more target objects TO1, TO2, TO3 and TO4 within the device image 410. For example, the device image 410 may be a black-and-white image, and the labels RD1, RD2, RD3 and RD4 may be red dots. In an embodiment, the detecting block 120 may generate the label image data representing an image 450 having only the labels RD1, RD2, RD3 and RD4 by separating a red image or a red channel from the device image 430 where the labels RD1, RD2, RD3 and RD4 may be marked. A pair or a set of the device image data representing the device image 410 of the test target device 200 and the label image data representing the image 450 having only the labels RD1, RD2, RD3 and RD4 may be accumulatively stored as the detection training set DTS in the detection training database 140 for the subsequent learning of the detection learning model 130. The detection learning model 130 may be learned or trained based on the detection training set DTS.

The region determining block 150 may determine a qualification region within the device image based on a position of the label. In an embodiment, the region determining block 150 may obtain a coordinate (for example, an X-coordinate and an Y-coordinate) of the label in the device image where the label may be marked, may determine the qualification region having a predetermined shape based on the coordinate of the label, and may generate qualification region image data representing the qualification region including the target object by cropping the qualification region from the device image. According to embodiments, the predetermined shape of the qualification region may be, but is not limited to, a substantially circular shape, a substantially rectangular shape, a substantially polygonal shape, for example.

For example, as illustrated in FIG. 7, the region determining block 150 may receive the labeled device image data representing the device image 430 where the labels RD1, RD2, RD3 and RD4 may be marked from the detecting block 120, and may receive the device image data representing the device image 410 test target device 200 from the detecting block 120 or the camera 110. The region determining block 150 may obtain the coordinates (for example, the X-coordinates and the Y-coordinates) of the labels RD1, RD2, RD3 and RD4 in the device image 430 where the labels RD1, RD2, RD3 and RD4 may be marked, and may determine qualification regions QR1, QR2, QR3 and QR4 having the predetermined shape in the device image 410 based on the coordinates of the labels RD1, RD2, RD3 and RD4 in the device image 430. In an example, as illustrated in FIG. 8A, each qualification region QRa may have a substantially circular shape having the coordinate of the label RD as a center point. In another example, as illustrated in FIG. 8B, each qualification region QRb may have a substantially rectangular shape having the coordinate of the label RD as a center point. In another example, as illustrated in FIG. 8C, each qualification region QRc may have a substantially polygonal shape having the coordinate of the label RD as a center point. However, the predetermined shape of each qualification region QR1, QR2, QR3 and QR4 is not limited to the examples of FIGS. 8A through 8C. For example, each qualification region QR1, QR2, QR3 and QR4 may have any shape having the coordinate of the label RD as a corner point or any other point. The region determining block 150 may generate the qualification region image data representing qualification regions 411, 412, 413 and 414 including the target objects TO1, TO2, TO3 and TO4 by cropping the qualification regions QR1, QR2, QR3 and QR4 from the device image 410.

By way of example in FIG. 1, the qualification block 160 may include a qualification training database 180 that may store a qualification training set QTS, or a pair of qualification region image training data QRITD and a training qualification result TQR for the qualification region image training data QRITD, and a qualification learning model 170 learned or trained based on the qualification training set QTS stored in the qualification training database 180. According to embodiments, the qualification learning model 170 may be any learning model, such as an AI model, a machine learning model, a deep learning model, a CNN model, a RNN model, for example. Here, the qualification region image training data QRITD may be the qualification region image data representing the qualification region including the target object which may be obtained for learning or training of the qualification learning model 170. Further, the training qualification result TQR may represent whether the target object within the qualification region represented by the qualification region image training data QRITD is good or defective. In an embodiment, the training qualification result TQR may not only represent whether the target object is good or defective, but also may further represent, but is not limited to, a class (for example, at least one good class and/or at least one defective class) of the target object. Further, in an embodiment, before the qualification learning model 170 is initially learned, or until the qualification learning model 170 is sufficiently learned, the training qualification result TQR may be determined by, but is not limited to, a human operator or a human manager.

The qualification learning model 170 learned or trained based on the qualification training set QTS including the qualification region image training data QRITD and the training qualification result TQR may receive the qualification region image data representing the qualification region including the target object from the region determining block 150, and may generate a qualification result by determining whether the target object within the qualification region represented by the qualification region image data is good or defective. In an embodiment, the qualification learning model 170 may further determine a class of the target object, and the qualification result may represent not only whether the target object is good or defective, but also the class (for example, at least one good class and/or at least one defective class) of the target object. For example, in a case where the auto qualification device 100 tests a glass substrate as the test target device 200, the qualification learning model 170 may perform classification which may determine the target object or a defect is a glass chip, a glass impurity or any other type of defect. In another example, in a case where the auto qualification device 100 tests a semiconductor wafer as the test target device 200, the qualification learning model 170 may perform classification which may determine the target object or a defect is a sticking impurity, a floating impurity or any other type of defect. In an embodiment, a pair or a set of the qualification region image data received from the region determining block 150 and the qualification result generated by the qualification learning model 170 may be accumulatively stored as the qualification training set QTS in the qualification training database 180 for a subsequent learning of the qualification learning model 170. Thus, the qualification learning model 170 may be continuously (for example, permanently) learned or trained based on the qualification training set QTS that may be automatically generated by the qualification block 160 or the qualification learning model 170, and thus accuracy or reliability of the qualification learning model 170 may be improved.

For example, as illustrated in FIG. 9, the qualification learning model 170 may receive the qualification region image data representing qualification regions 411, 412, 413 and 414 including target objects from the region determining block 150. The qualification learning model 170 may generate qualification results RES1, RES2, RES3 and RES4 by determining whether the target objects within the qualification regions 411, 412, 413 and 414 are good or defective. Pairs or sets of the qualification region image data representing qualification regions 411, 412, 413 and 414 and the qualification results RES1, RES2, RES3 and RES4 representing whether the target objects are good or defective may be accumulatively stored as qualification training sets QTS1, QTS2, QTS3 and QTS4 in the qualification training database 180 for the subsequent learning of the qualification learning model 170. The qualification learning model 170 may be learned or trained based on the qualification training sets QTS1, QTS2, QTS3 and QTS4.

A related art test process may determine whether the target object of the test target device 200 is good or defective with the naked eye of a human operator or a human manager, or may perform a rule-based image processing to determine whether the target object of the test target device 200 is good or defective. Accordingly, the related art test process cannot be rapidly performed with respect to the entire test target devices 200. Further, in a case where the test target device 200 has an exceptional defect, the related art test process cannot accurately determine whether the target object is good or defective.

However, in the auto qualification device 100 according to embodiments, the label may be marked at the target object within the device image by using the detection learning model 130 that may be trained based on the detection training set DTS, the qualification region within the device image may be determined based on the position of the label, and whether the target object within the qualification region is defective or not may be determined by using the qualification learning model 170 that may be trained based on the qualification training set QTS. Accordingly, the auto qualification device 100 may rapidly and accurately perform a test process for the test target device 200 by using the detection and qualification learning models 130 and 170. By way of example, in the auto qualification device 100 according to embodiments, the detection learning model 130 for detection of the target object and the qualification learning model 170 for qualification of the target object may be divided, and thus accuracy and reliability of each of the detection and the qualification of the target object may be improved compared with a case where detection and qualification of the target object are performed by using a single learning model. Further, in the auto qualification device 100 according to embodiments, the detection learning model 130 for the detection of the target object may not set an outline of the target object, but may mark only the label (for example, the red dot) at the target object, thereby further improving the accuracy and the reliability of the detection of the target object.

Figure 10:
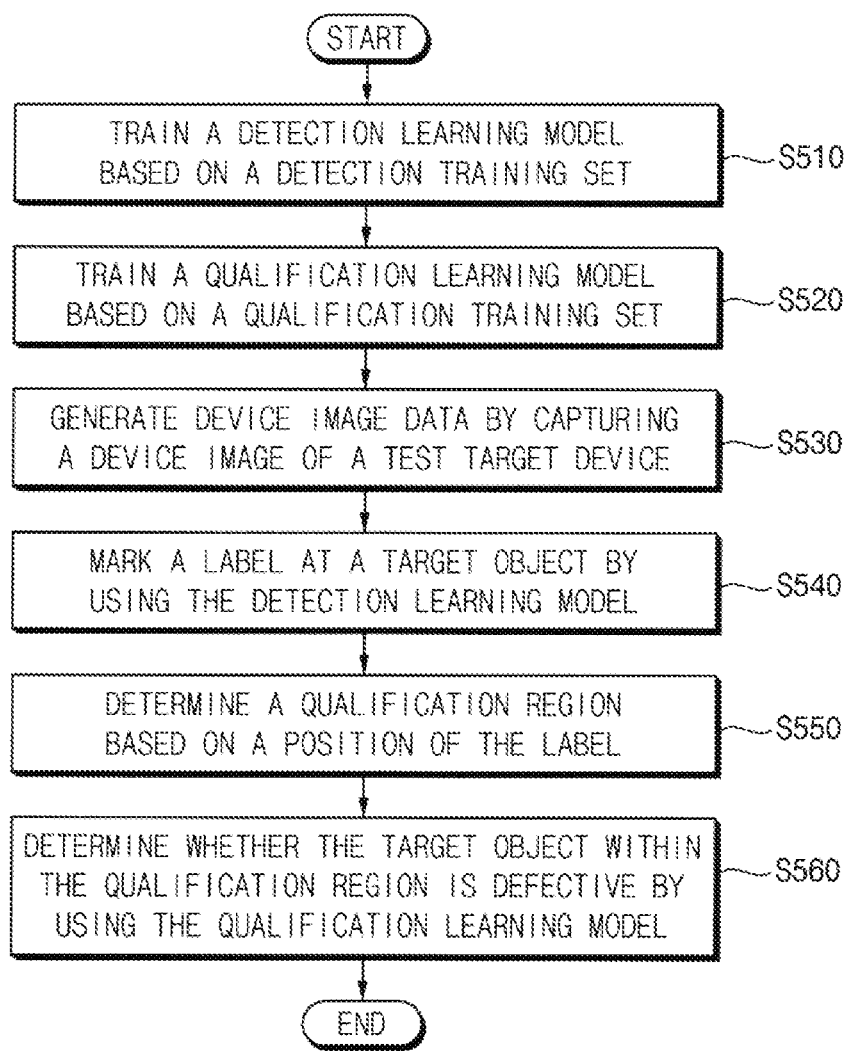
FIG. 10 is a flowchart illustrating an auto qualification method according to embodiments.

FIG. 10 is a flowchart illustrating an auto qualification method according to embodiments.

Referring to FIGS. 1 and 10, in an auto qualification method according to embodiments, a detection learning model 130 of a detecting block 120 may be learned or trained based on a detection training set DTS of device image training data DITD representing a device image (for learning or training) of a test target device 200 and label image training data LITD representing only a label having a position corresponding to a target object within the device image (S510). Further, a qualification learning model 170 of a qualification block 160 may be learned or trained based on a qualification training set QTS of qualification region image training data QRITD representing a qualification region (for learning or training) including the target object within the device image and a training qualification result QTS representing whether the target object is good or defective (S520).

A camera 110 may generate device image data representing a device image of the test target device 200 by capturing the device image of the test target device 200 (S530). The detecting block 120 may mark a label at a target object within the device image represented by the device image data by using the detection learning model 130 (S540). In an embodiment, a color of the label marked by the detecting block 120 may be different from a color of the device image. For example, the device image may be a black-and-white image, and the label marked by the detecting block 120 may be a red dot. In an embodiment, the detecting block 120 may generate labeled device image data representing the device image where the label may be marked by marking the label at the target object within the device image, and may generate label image data representing the label by separating an image (for example, a red image or a red channel) having a color of the label from the labeled device image data. A set of the device image data and the label image data may be accumulatively stored as the detection training set DTS in a detection training database 140 for a subsequent learning of the detection learning model 130.

A region determining block 150 may determine a qualification region within the device image based on a position of the label (S550). The qualification block 160 may receive qualification region image data representing the qualification region including the target object from the region determining block 150, and may generate a qualification result by determining whether the target object within the qualification region represented by the qualification region image data is good or defective by using the qualification learning model 170 (S560). In an embodiment, a set of the qualification region image data and the qualification result may be accumulatively stored as the qualification training set QTS in a qualification training database 180 for a subsequent learning of the qualification learning model 170.

As described above, in the auto qualification method according to embodiments, the label may be marked at the target object within the device image by using the detection learning model 130 that may be trained based on the detection training set DTS, the qualification region within the device image may be determined based on the position of the label, and whether the target object within the qualification region is defective or not may be determined by using the qualification learning model 170 that may be trained based on the qualification training set QTS. Accordingly, accuracy and reliability of detection and qualification for the target object may be improved.

Figure 11:
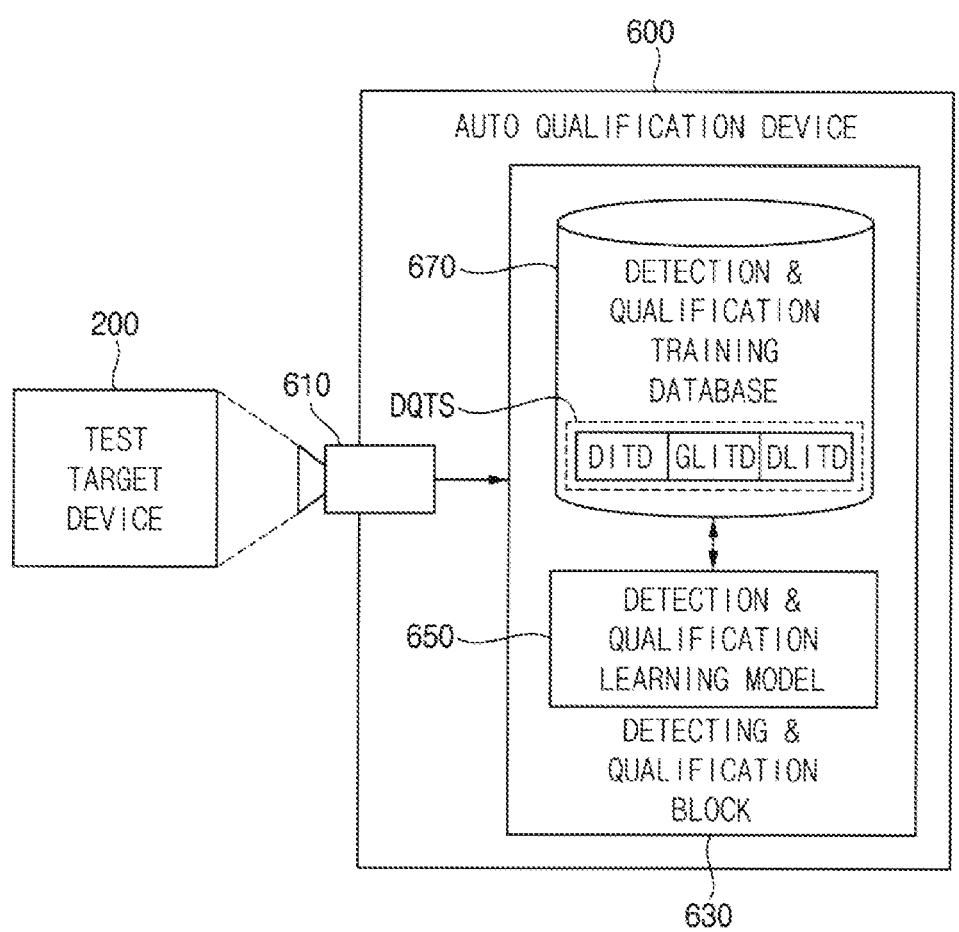
FIG. 11 is a block diagram illustrating an auto qualification device according to embodiments.
Figure 12:
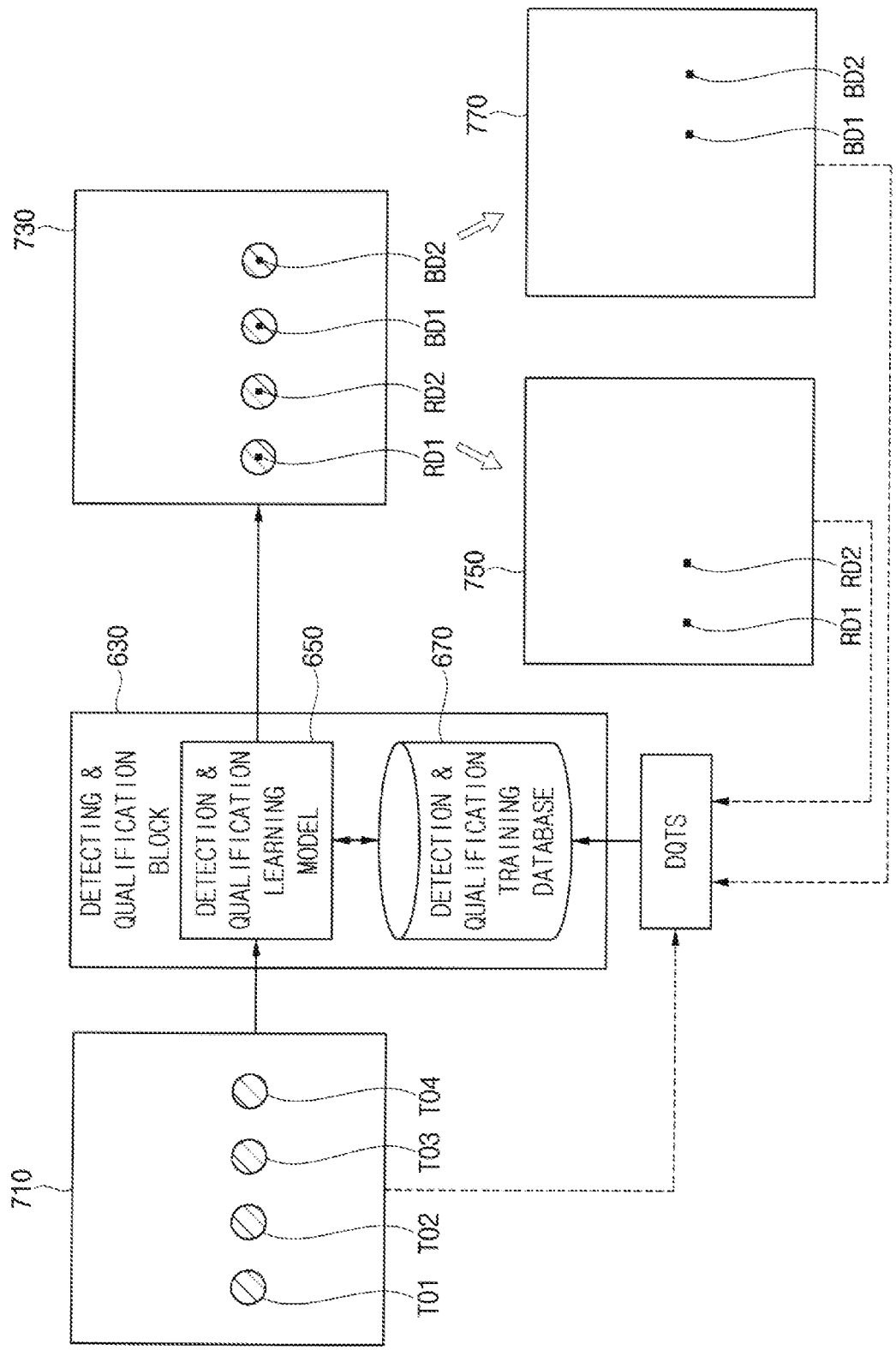
FIG. 12 is a diagram for describing an example of an operation of a detecting and qualification block.

FIG. 11 is a block diagram illustrating an auto qualification device according to embodiments, and FIG. 12 is a diagram for describing an example of an operation of a detecting and qualification block.

Referring to FIG. 11, an auto qualification device 600 for a test target device 200 according to embodiments may include a camera 610 and a detecting and qualification block or a detecting and qualification determiner 630. The detecting and qualification block 630 may include a detection and qualification learning model 650 and a detection and qualification training database 670. Unlike an auto qualification device 100 including a detection learning model 130 for detection of a target object and a qualification learning model 170 for qualification of the target object illustrated in FIG. 1, the auto qualification device 600 may include the single detection and qualification learning model 650.

The camera 610 may generate device image data representing a device image of the test target device 200 by capturing the device image of the test target device 200. The detection and qualification training database 670 may store a detection and qualification training set DQTS of device image training data DITD representing a device image (for learning or training) of the test target device 200, good label image training data GLITD representing a good or first label having a position corresponding to a good or first target object among target objects within the device image, and defective label image training data DLITD representing a defective or second label having a position corresponding to a defective or second target object among the target objects within the device image. In an embodiment, before the detection and qualification learning model 650 is initially learned, or until the detection and qualification learning model 650 is sufficiently learned, the good label image training data GLITD and the defective label image training data DLITD corresponding to the device image training data DITD may be generated by, but is not limited to, a human operator or a human manager. The detection and qualification learning model 650 may be learned or trained based on the detection and qualification training set DQTS stored in the detection and qualification training database 670. According to embodiments, the detection and qualification learning model 650 may be any learning model, such as an AI model, a machine learning model, a deep learning model, a CNN model, a RNN model, for example.

The detection and qualification learning model 650 learned or trained based on the detection and qualification training set DQTS may receive the device image data representing the device image of the test target device 200 from the camera 610, may mark a good or first label at a good or first target object within the device image represented by the device image data, and may mark a defective or second label at a defective or second target object within the device image. In an embodiment, the device image may have a first color, the good or first label may have a second color different from the first color, and the defective or second label may have a third color different from the first and second colors. For example, the device image may be, but is not limited to, a black-and-white image, the good or first label may be, but is not limited to, a red dot, and the defective or second label may be, but is not limited to, a blue dot. In an embodiment, the good or first label may include one or more good class labels respectively corresponding to one or more good classes, and the one or more good class labels may have different colors. Further, in an embodiment, the defective or second label may include one or more defective class labels respectively corresponding to one or more defective classes, and the one or more defective class labels may have different colors.

In an embodiment, the detection and qualification learning model 650 may generate labeled device image data representing the device image where the good or first label and the defective or second label may be marked by marking the good or first label at the good or first target object within the device image and by marking the defective or second label at the defective or second target object within the device image. Further, the detection and qualification learning model 650 may generate good label image data representing the good or first label by separating an image (for example, a red image or a red channel) having a color of the good or first label from the labeled device image data, and may generate defective label image data representing the defective or second label by separating an image (for example, a blue image or a blue channel) having a color of the defective or second label from the labeled device image data. A set of the device image data, the good or first label image data and the defective label image data may be accumulatively stored as the detection and qualification training set DQTS in the detection and qualification training database 670 for a subsequent learning of the detection and qualification learning model 650. Thus, the detection and qualification learning model 650 may be continuously (for example, permanently) learned or trained based on the detection and qualification training set DQTS that may be automatically generated by the detecting and qualification block 630 or the detection and qualification learning model 650, and thus accuracy or reliability of the detection and qualification learning model 650 may be improved.

For example, as illustrated in FIG. 12, the detection and qualification learning model 650 may receive the device image data representing a device image 710 of the test target device 200 from the camera 610. For example, the device image 710 of the test target device 200 may include a plurality of target objects TO1, TO2, TO3 and TO4, a portion TO1 and TO2 of the plurality of target objects TO1, TO2, TO3 and TO4 may be good or first target objects TO1 and TO2 that are good or have no defect, and another portion TO3 and TO4 of the plurality of target objects TO1, TO2, TO3 and TO4 may be defective or second target objects TO3 and TO4 that are defective or have defects. The detection and qualification learning model 650 may generate the labeled device image data representing a device image 730 where good or first labels RD1 and RD2 and defective or second labels BD1 and BD2 may be marked by marking the good or first labels RD1 and RD2 at the good or first target objects TO1 and TO2 within the device image 710 and by marking the defective or second labels BD1 and BD2 at the defective or second target objects TO3 and TO4 within the device image 710. For example, the device image 710 may be, but is not limited to, a black-and-white image, the good or first labels RD1 and RD2 may be, but not limited to, red dots, and the defective or second labels BD1 and BD2 may be, but not limited to, blue dots. In an embodiment, the detecting and qualification block 630 may generate the good label image data representing an image 750 having only the good or first labels RD1 and RD2 by separating a red image or a red channel from the device image 730 where the good or first labels RD1 and RD2 and the defective or second labels BD1 and BD2 may be marked, and may generate the defective label image data representing an image 770 having only the defective or second labels BD1 and BD2 by separating a blue image or a blue channel from the device image 730 where the good or first labels RD1 and RD2 and the defective or second labels BD1 and BD2 may be marked. A set of the device image data representing the device image 710, the good label image data representing the image 750 having only the good or first labels RD1 and RD2, and the defective label image data representing the image 770 having only the defective or second labels BD1 and BD2 may be accumulatively stored as the detection and qualification training set DQTS in the detection and qualification training database 670 for the subsequent learning of the detection and qualification learning model 650. Thus, the detection and qualification learning model 650 may be learned or trained based on the detection and qualification training set DQTS.

As described above, in the auto qualification device 600 according to embodiments, by using the detection and qualification learning model 650 learned or trained based on the detection and qualification training set DQTS, the good or first label may be marked at the good or first target object within the device image, and the defective or second label may be marked at the defective or second target object within the device image. Accordingly, accuracy and reliability of detection and qualification for the good or first/defective or second target object may be improved.

Figure 13:
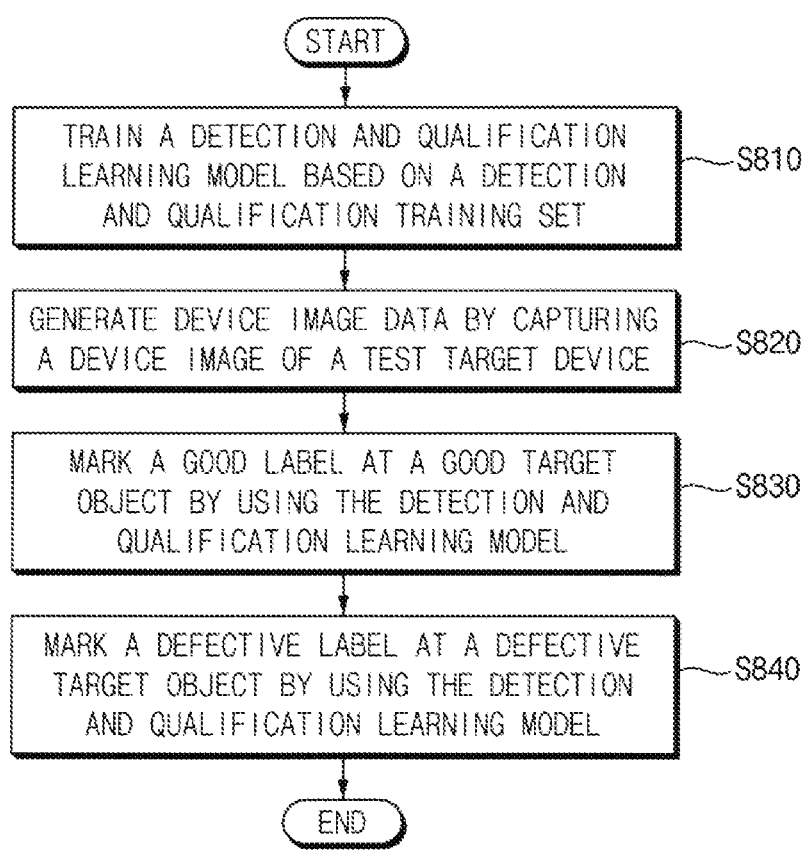
FIG. 13 is a flowchart illustrating an auto qualification method according to embodiments.

FIG. 13 is a flowchart illustrating an auto qualification method according to embodiments.

Referring to FIGS. 11 and 13, in an auto qualification method according to embodiments, a detection and qualification learning model 650 of a detecting and qualification block 630 may be learned or trained based on a detection and qualification training set DQTS of device image training data DITD representing a device image (for learning or training) of a test target device 200, good label image training data GLITD representing a good or first label having a position corresponding to a good or first target object among target objects within the device image, and defective label image training data DLITD representing a defective or second label having a position corresponding to a defective or second target object among the target objects within the device image (S810).

A camera 610 may generate device image data representing a device image of the test target device 200 by capturing the device image of the test target device 200 (S820). By using the detection and qualification learning model 650, the detecting and qualification block 630 may mark a good or first label at a good or first target object within the device image represented by the device image data (S830), and may mark a defective or second label at a defective or second target object within the device image (S840). In an embodiment, the device image may have a first color, the good or first label may have a second color different from the first color, and the defective or second label may have a third color different from the first and second colors. For example, the device image may be, but is not limited to, a black-and-white image, the good or first label may be, but is not limited to, a red dot, and the defective or second label may be, but is not limited to, a blue dot. In an embodiment, the detecting and qualification block 630 may generate good label image data representing the good or first label by separating an image (for example, a red image or a red channel) having a color of the good or first label from the labeled device image data representing the device image where the good or first label and the defective or second label may be marked, and may generate defective label image data representing the defective or second label by separating an image (for example, a blue image or a blue channel) having a color of the defective or second label from the labeled device image data. A set of the device image data, the good label image data and the defective label image data may be accumulatively stored as the detection and qualification training set DQTS in a detection and qualification training database 670 for a subsequent learning of the detection and qualification learning model 650.

As described above, in the auto qualification method according to embodiments, by using the detection and qualification learning model 650 learned or trained based on the detection and qualification training set DQTS, the good or first label may be marked at the good or first target object within the device image, and the defective or second label may be marked at the defective or second target object within the device image. Accordingly, accuracy and reliability of detection and qualification for the good or first/defective or second target object may be improved.

The disclosure may be used in determining whether any electronic or mechanical device is a good product or a defective product or in detecting its defect.

The foregoing is illustrative of embodiments and is not to be construed as limiting thereof. Although embodiments have been described, those skilled in the art will readily appreciate that many modifications are possible in the embodiments without materially departing from the novel teachings and advantages of the disclosure. Accordingly, all such modifications are intended to be included within the scope of the disclosure as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. An auto qualification device for a test target device, the auto qualification device comprising:
    a camera that generates device image data by capturing a device image of the test target device; and
    a processor that includes:
        a detector that marks a label at a target object within the device image of the test target device by using a detection learning model trained based on a detection training set of device image training data and label image training data corresponding to the device image training data;
        a region determiner that determines a qualification region within the device image of the test target device based on a position of the label; and
        a qualification determiner that determines whether the target object within the qualification region is defective by using a qualification learning model trained based on a qualification training set of qualification region image training data and a training qualification result for the qualification region image training data,
    wherein the detector:
        generates labeled device image data representing the device image of the test target device where the label is marked by marking the label at the target object within the device image of the test target device, the labeled device image data being the label superimposed on the device image; and
        generates label image data representing the label by separating an image having a color of the label from the labeled device image data.

2. The auto qualification device of claim 1, wherein a color of the label marked by the detector is different from a color of the device image of the test target device captured by the camera.

3. The auto qualification device of claim 1, wherein
    the device image of the test target device is a black-and-white image, and
    the label marked by the detector is a red dot.

4. The auto qualification device of claim 1, wherein the detector includes:
    a detection training database that stores the detection training set of the device image training data and the label image training data; and
    the detection learning model trained based on the detection training set stored in the detection training database, and
    a set of the device image data and the label image data is accumulatively stored as the detection training set in the detection training database for a subsequent learning of the detection learning model.

5. The auto qualification device of claim 1, wherein the region determiner:
    obtains a coordinate of the label in the device image of the test target device where the label is marked;
    determines the qualification region having a predetermined shape based on the coordinate of the label; and
    generates qualification region image data representing the qualification region including the target object by cropping the qualification region from the device image of the test target device.

6. The auto qualification device of claim 5, wherein the predetermined shape of the qualification region is a substantially circular shape, a substantially rectangular shape or a substantially polygonal shape.

7. The auto qualification device of claim 5, wherein the qualification determiner:
    receives the qualification region image data representing the qualification region including the target object from the region determiner; and
    generates a qualification result by determining whether the target object within the qualification region represented by the qualification region image data is defective.

8. The auto qualification device of claim 7, wherein the qualification determiner includes:
- a qualification training database that stores the qualification training set of the qualification region image training data and the training qualification result; and
- the qualification learning model trained based on the qualification training set stored in the qualification training database, and
- a set of the qualification region image data and the qualification result is accumulatively stored as the qualification training set in the qualification training database for a subsequent learning of the qualification learning model.

9. The auto qualification device of claim 1, wherein the test target device is a fine metal mask assembly, and the target object is a welding point in the fine metal mask assembly.

10. The auto qualification device of claim 1, wherein the test target device is a display panel or a semiconductor wafer.

11. The auto qualification device of claim 1, wherein the detector comprises:
- the detection learning model; and
- a detection training database connected to the detection learning model, the detection training database including the detection training set that includes the device image training data and the label image training data.

12. An auto qualification method for a test target device, the auto qualification method comprising:
- training a detection learning model based on a detection training set of device image training data and label image training data corresponding to the device image training data;
- training a qualification learning model based on a qualification training set of qualification region image training data and a training qualification result for the qualification region image training data;
- generating device image data by capturing a device image of the test target device;
- marking a label at a target object within the device image of the test target device by using the detection learning model, wherein marking the label at the target object includes:
  - generating labeled device image data representing the device image of the test target device where the label is marked by marking the label at the target object within the device image of the test target device, the labeled device image data being the label superimposed on the device image; and
  - generating label image data representing the label by separating an image having a color of the label from the labeled device image data;
- determining a qualification region within the device image of the test target device based on a position of the label; and
- determining whether the target object within the qualification region is defective by using the qualification learning model.

13. The auto qualification method of claim 12, wherein a color of the label is different from a color of the device image of the test target device.

14. The auto qualification method of claim 12, wherein the device image of the test target device is a black-and-white image, and the label is a red dot.

15. The auto qualification method of claim 12, wherein marking the label at the target object further includes:
- accumulatively storing a set of the device image data and the label image data as the detection training set in a detection training database for a subsequent learning of the detection learning model.

* * * * *